United States Patent [19]
Acher et al.

[11] Patent Number: 5,726,655
[45] Date of Patent: Mar. 10, 1998

[54] ANISOTROPIC MICROWAVE COMPOSITE

[75] Inventors: Olivier Acher, Antony; Jean-Luc Vermeulen, Rosny-Sous-Bois; Jean-Marie Fontaine, Limours, all of France

[73] Assignee: Commissariat A L'Energe Atomique, Paris, France

[21] Appl. No.: 492,207

[22] Filed: May 25, 1995

[30] Foreign Application Priority Data

Nov. 25, 1992 [FR] France .................................. 92 14182

[51] Int. Cl.$^6$ ................................................ H01Q 17/00
[52] U.S. Cl. ........................................ 342/1; 342/4
[58] Field of Search ................................ 342/1, 2, 3, 4

[56] References Cited

U.S. PATENT DOCUMENTS

| | | | |
|---|---|---|---|
| 2,610,250 | 9/1952 | Wheeler | 333/81 A |
| 3,540,047 | 11/1970 | Walser et al. | 342/1 |
| 5,047,296 | 9/1991 | Miltenberger et al. | 428/694 |
| 5,085,931 | 2/1992 | Boyer, III et al. | 428/328 |
| 5,148,172 | 9/1992 | Kumurdjian | 342/1 |
| 5,169,713 | 12/1992 | Kumurdjian | 428/323 |
| 5,323,160 | 6/1994 | Kim et al. | 342/1 |
| 5,325,094 | 6/1994 | Broderick et al. | 342/1 |
| 5,328,523 | 7/1994 | Fontaine et al. | 148/108 |
| 5,435,903 | 7/1995 | Oda et al. | 205/77 |
| 5,514,337 | 5/1996 | Groger et al. | 422/82.08 |
| 5,523,157 | 6/1996 | Sasaki et al. | 428/403 |
| 5,576,710 | 11/1996 | Broderick et al. | 342/1 |
| 5,594,397 | 1/1997 | Uchikoba et al. | 333/202 |

FOREIGN PATENT DOCUMENTS 0468887  7/1991  European Pat. Off. .

OTHER PUBLICATIONS

Patent Abstracts of Japan, vol. 8, No. 239 (E 276).
Journal of Physics, vol. 3 No. C3.
Patent Abstracts of Japan, vol. 8, 245 (P–312).

Primary Examiner—John B. Sotomayor
Attorney, Agent, or Firm—Cesari and McKenna, LLP

[57] ABSTRACT

The composite according to the invention comprises a stack of alternately ferromagnetic and insulating, thin layers (12, 14) receiving on their edge the electromagnetic field to be transformed.

14 Claims, 7 Drawing Sheets

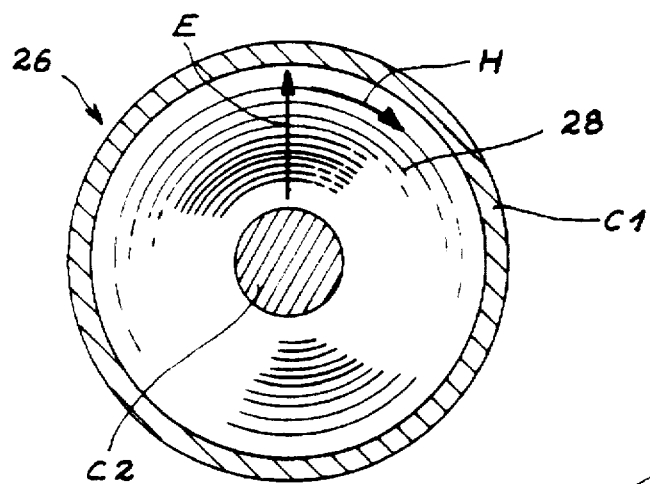
FIG. 7
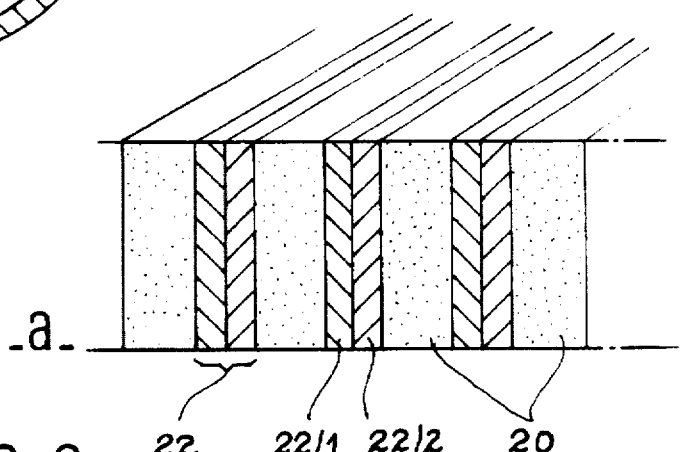
FIG. 8
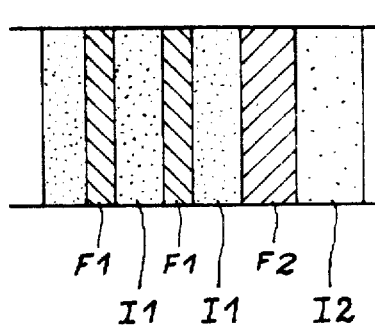
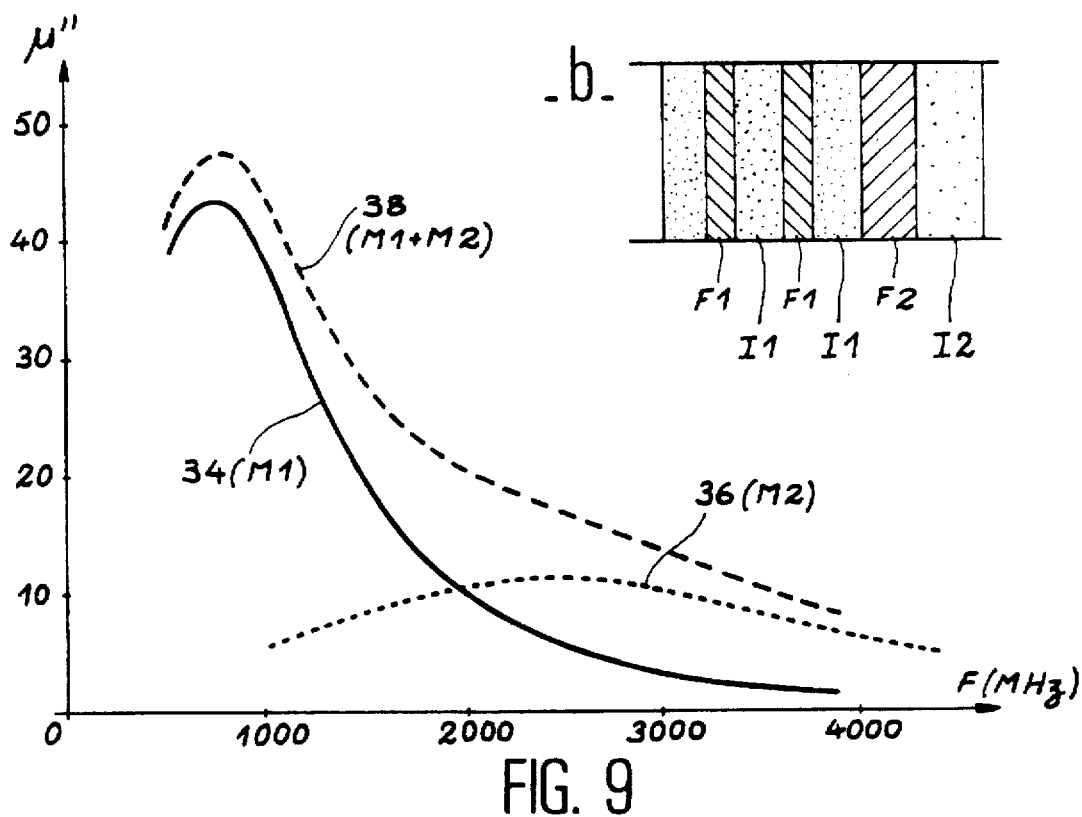
FIG. 9

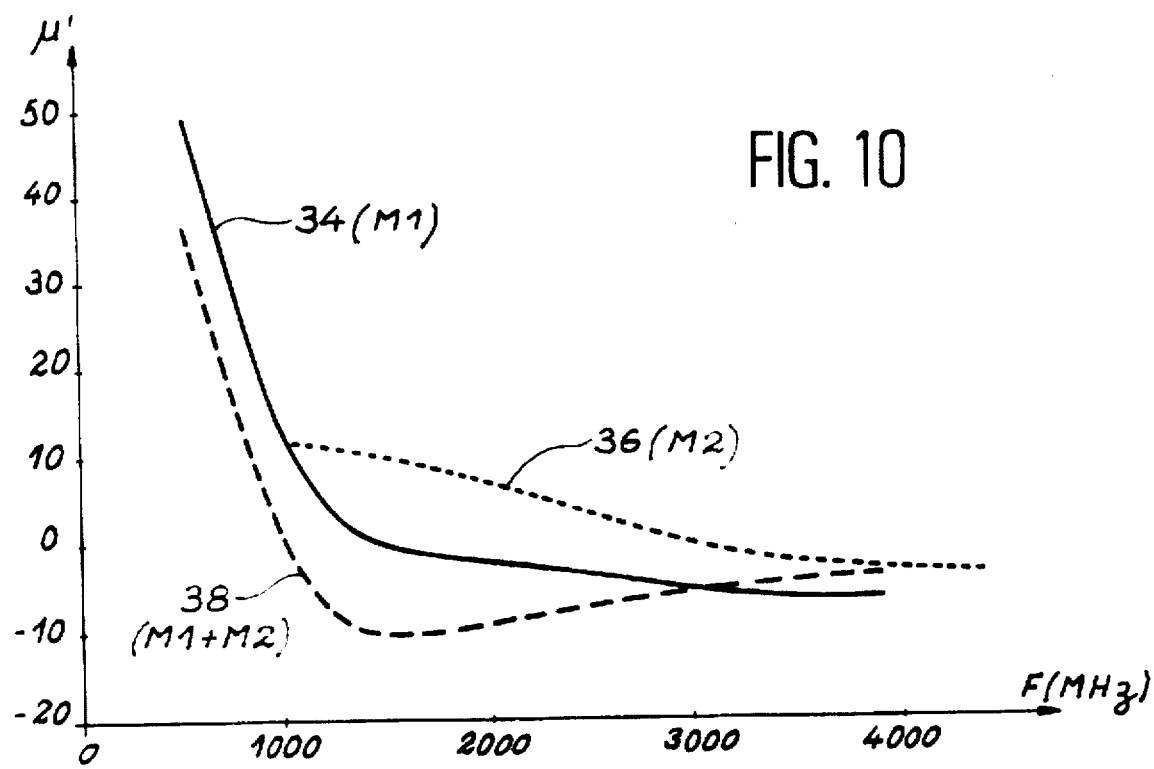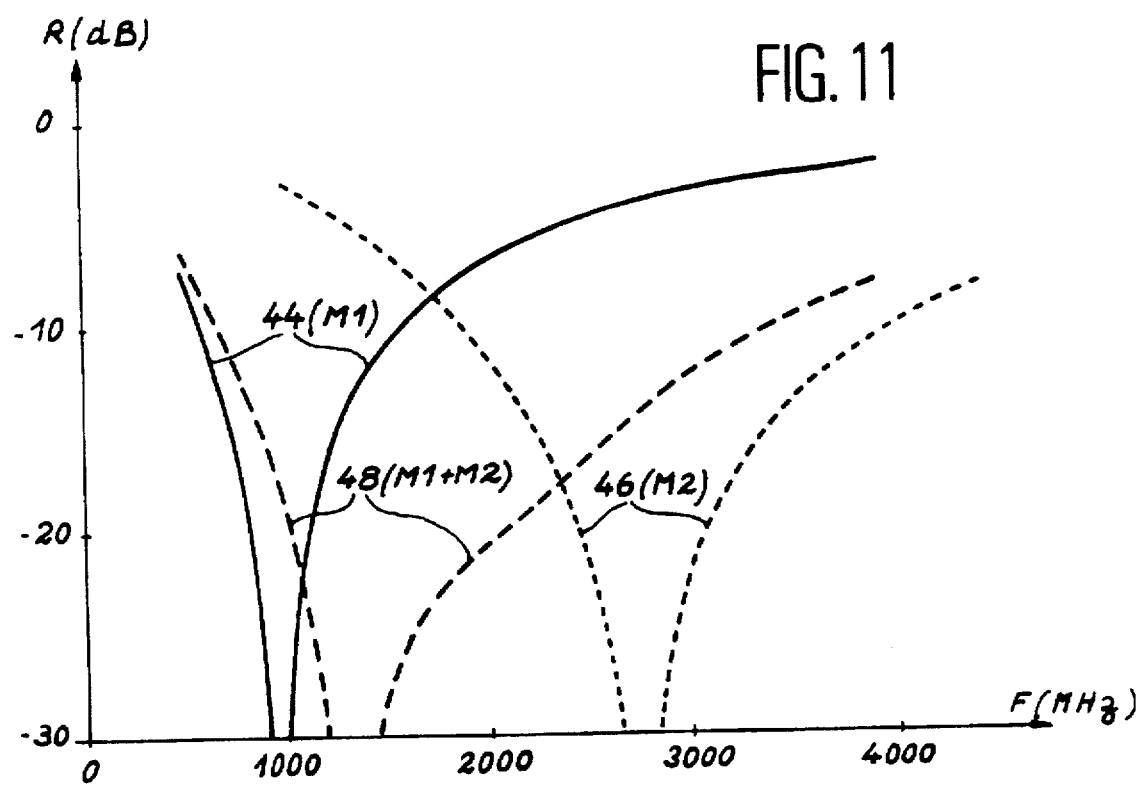

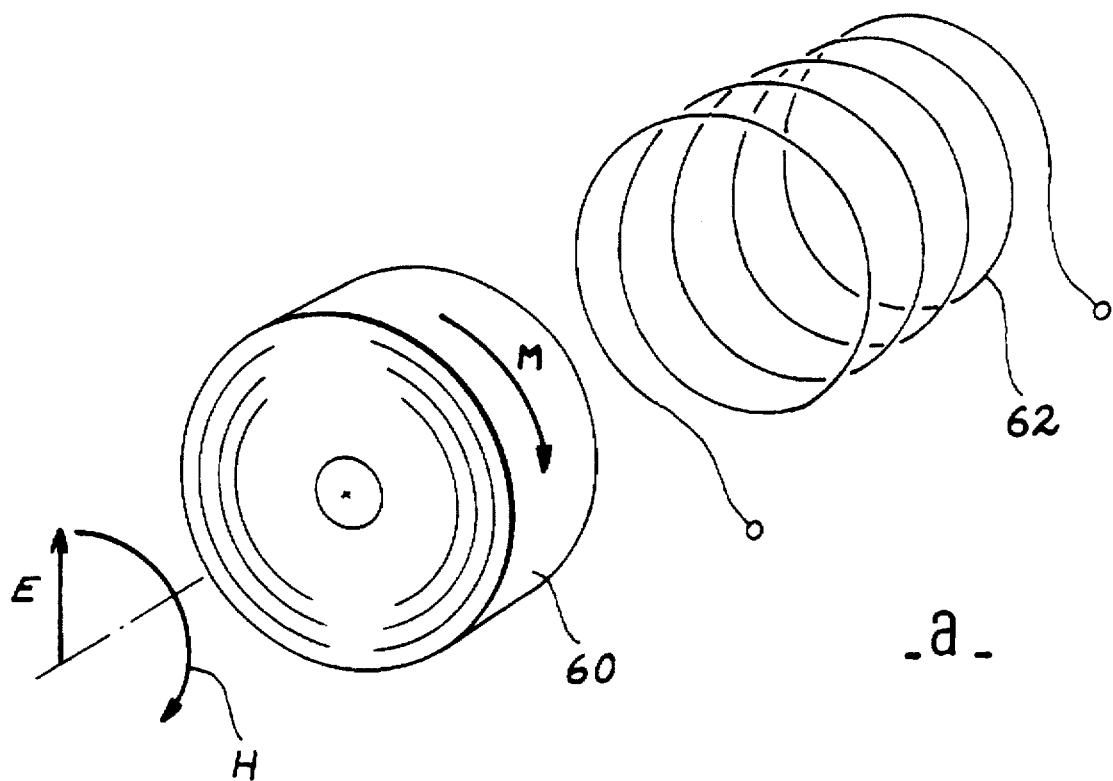
FIG. 13
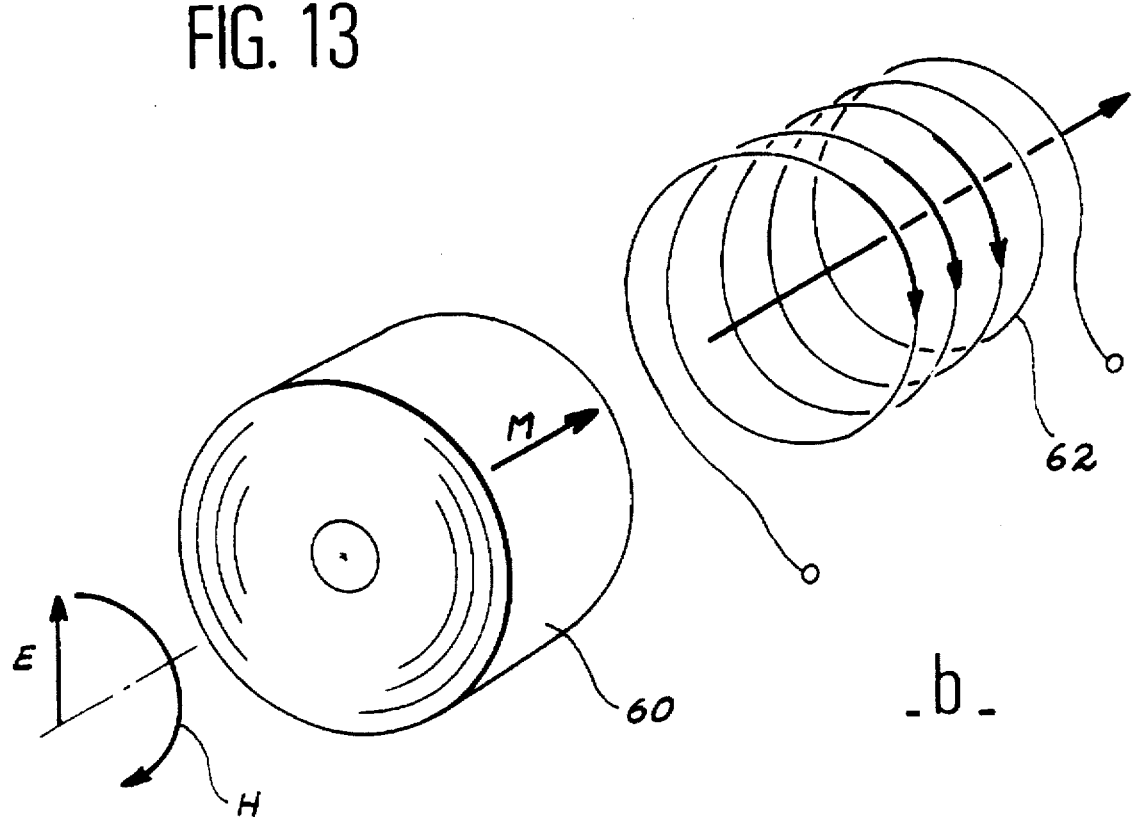

ANISOTROPIC MICROWAVE COMPOSITE

FIELD OF THE INVENTION

The present invention relates to an anisotropic microwave composite.

The composite according to the invention is either absorbent, or transparent, or reflecting, as a function of the conditions of use, i.e. according to the orientation of the magnetic and/or electrical components of the electromagnetic field which it receives.

Therefore the technical field of the invention is that of microwaves, where the composite can be used in the waveguide, in coaxial lines, etc., or in a free atmosphere, e.g. in echoless chambers, or close to an antenna for modifying its transmission lobes.

BACKGROUND OF THE INVENTION

The composite according to the invention belongs to the category of magnetic composites using a stack of thin magnetic layers or films.

For a magnetic material to make it possible to produce an absorber, it is preferable that it is not conductive, otherwise it would behave like a perfect reflector. A first family of magnetic materials, namely the ferrites, at once satisfies these conditions and is widely used.

However, the family of ferromagnetic materials is highly conductive. In order to produce an absorber, it is then standard practice to disperse a finely divided ferromagnetic material (in powder or flake form) in an insulating matrix. It is then possible to obtain an insulating and magnetic composite. However, the relative permeability level μ obtained are low (imaginary component μ" a few units), well below the product of the intrinsic permeability of the charge multiplied by its volume fraction. This is particularly true at low charge rates.

All this helps to give heavy, thick materials with a high magnetic charge volume proportion, which is prejudicial to their mechanical qualities and to their resistance to the environment.

In addition, the production methods used for magnetic powders do not generally permit a good control of the composition and crystalline properties, which condition the magnetic properties of the material.

According to other known embodiments, the ferromagnetic layers are deposited on a substrate, but in fragmented form. U.S. Pat. No. 3,540,047 e.g. describes a material constituted by elements (shavings, disks, flakes) dispersed in a dielectric material. Each element comprises a stack of ferromagnetic layers and insulating layers.

In addition to the disadvantages referred to hereinbefore, these composite materials with thin ferromagnetic layers suffer from the disadvantage of only fulfilling a single function, namely absorption.

The present invention aims at obviating these disadvantages. To this end, it proposes a material having a good mechanical quality and a wide pass band (around tuning frequencies from about 100 megaHertz to several dozen gigaHertz). Moreover, the composite according to the invention has a great flexibility of use, because it can be used both as an absorbing, reflecting or transparent material, as a function of the use conditions.

The physical phenomenon on which the invention is based is the absorption by gyromagnetic resonance in a ferromagnetic material. This phenomenon is known and is in particular described in the article by C. KITTEL entitled "On the theory of ferromagnetic resonance absorption", published in Physical Review, 73, 155, 1948.

In addition, the material according to the invention is a stratified material. Research has already been carried out on the measurement of the magnetic permeability in such stratified materials. Reference can in particular be made to the article by S. M. RYTOV entitled "Electromagnetic properties of a finely stratified medium" published in Soviet Physics JETP, vol. 2, No. 3, May 1956, pp 466–475.

Although the thickness of the ferromagnetic material is small compared with the skin thickness at the operating frequency, the permeability of the ferromagnetic material $\mu_f$ is linked with the permeability measured for the composite, i.e. $\mu_m$, by the relation:

$$\mu_f = 1 + (\mu_m - 1)/F$$

in which F is the ferromagnetic material charge rate.

If the thickness of the ferromagnetic layer is no longer negligible compared with the skin thickness, the relation is more complex and becomes:

$$\mu_m = [(1 - F) + F \cdot C\mu_f]/[1 + F(C - 1)]$$

with $$C = \frac{tg(\pi N_f e_f/\lambda)}{\pi N_f e_f/\lambda}$$

in which F again designates the ferromagnetic charge rate and in which ν is the wavelength, $e_f$ the ferromagnetic layer thickness, $N_f$ the index of the ferromagnetic material (equal to the square root of the product of the electrical permittivity by the permeability at the considered frequency). This relation can be numerically solved in order to find $u_f$ as a function of the measured permeability $u_m$.

SUMMARY OF THE INVENTION

More specifically, the invention relates to a stack of alternately ferromagnetic and insulating layers, which no longer work in the longitudinal position (i.e. parallel to the surface on which they are deposited) as in the prior art, but instead in the transverse position, i.e perpendicular (or substantially perpendicular) to said surface. In other words, the layers receive the electromagnetic wave to be treated by the edge. This is what makes it possible to choose the function fulfilled by the composite by designing the latter in such a way that its layers are oriented either in accordance with the magnetic component of the electromagnetic field or in accordance with the electrical component.

The composite is anisotropic, i.e. it is unable to react identically for all electromagnetic fields. Thus, it only operates correctly for a particular propagation mode, when it is placed in a waveguide, or for a particular polarization when it is in free space.

Finally, according to the invention, a choice is made of a material offering high magnetic losses, i.e a high imaginary component of the permeability (μ"), but a low real component (μ').

More specifically, the present invention relates to an anisotropic microwave composite intended to receive an electromagnetic field, said composite comprising an alternating stack of thin ferromagnetic layers and thin electrically insulating layers, said thin ferromagnetic and insulating layers receiving by the edge the incident electromagnetic field, characterized in that the electromagnetic field has a frequency between about 100 megaHertz and several dozen gigaHertz, so that at said frequency the ferromagnetic layers have a magnetic permeability with a low real part µ' and a high imaginary part µ".

According to a first embodiment, the ferromagnetic layers are planar lamellas all oriented parallel to the same direction, the incident electromagnetic field having its electrical or magnetic field parallel to said direction.

In this case, the layers are not necessarily strictly perpendicular to the free surface. They can be slightly inclined, e.g. by an angle up to approximately 80° (between the perpendicular to the coating and the layers).

It was not a priori obvious that such a variation would not ruin the performance characteristics of the composite. However, the applicant has demonstrated that there is a relatively wide tolerance on the orientation of the layers, which gives considerable flexibility in the production of the composite.

This first embodiment is more particularly intended for applications in rectangular waveguides or in free space, in the laboratory or in the echoless chamber.

In a second embodiment, the ferromagnetic and insulating layers are coil wound onto themselves. This second embodiment is more particularly intended for applications in coaxial lines, where the magnetic field is tangential and the electrical field radial.

In both these embodiments, the ferromagnetic layers have a thickness between a fraction of the skin thickness at the frequency of the electromagnetic field and approximately ten times said skin thickness.

With regards to the ferromagnetic material volume fraction compared with the complete ferromagnetic-insulating composite, it is between 0.3 and 70%.

The thickness of the composite calculated in the plane of the layers is between 0.1 and 10e, in which e is given by the formula:

$$e=C/(2 F_r \mu"_r)$$

where $F_r$ is the resonant frequency of the ferromagnetic material and $\mu"_r$ the value of the imaginary component of the magnetic permeability of the composite at said frequency.

The invention is not limited to the case where the ferromagnetic layers are made from a single material. More generally, the ferromagnetic and/or insulating layers can be constituted by several different materials.

In certain cases, it can be of interest to use ferromagnetic layers having an easy magnetization axis directed in the plane of the layers.

It is also pointed out that electrical engineering makes use of magnetic materials for producing transformer cores or inductance coils. The sought properties are then a high real permeability and low magnetic losses (i.e. a high real component µ' and a low imaginary component µ"). It is therefore standard practice to use toroidal cores produced by coil winding an insulated ferromagnetic tape in order to produce the core of a transformer. In this case, the primary and secondary windings are wound around a section of the toroidal core. The flux lines are essentially confined in the toroidal core and the high permeability of the material forming said core permits a good coupling between the two windings.

Use is made of a tape, whose thickness is small compared with skin thickness at the operating frequencies and not a solid material, in order to avoid losses due to the skin effect. The ferromagnetic material must also have low losses (low µ").

These toroidal cores are usually intended to operate in a frequency range hardly exceeding a few hundred kiloHertz. At such frequencies, the permeability of the ferromagnetic tapes used result from wall movements. This wall permeability is generally dominant at frequencies below a few dozen megaHertz.

In electrotechnical applications, the wound insulating-ferromagnetic composites are in the zone where the microwave field is produced (in the core of an inductance coil or transformer). Their geometry is adapted to the zone where the field is produced (core of an inductance coil) and optionally that where it is to be transported (coupling a transformer primary to a transformer secondary).

The composites to which the present invention relates are very different, because they are adapted to the modification of the propagation of a microwave produced by a source independent of the composite. Moreover, unlike in the case of the known windings for which low losses are sought (high µ', low µ"), the composites according to the invention have a high component µ" and a low component µ'. Moreover, the aim is not to obtain ferromagnetic thicknesses which are systematically small compared with the skin thickness.

The invention also applies to frequencies from about 100 MHz to several dozen GHz. Such frequencies correspond to a gyromagnetic permeability and not to a wall permeability, like that found at low frequency. This has direct consequences for the production or shaping of the thin layers. Thus, the latter generally have a preferred direction in their plane, known as the easy magnetization axis. The direction of this axis can be imposed at the time of deposition by that of a residual or voluntarily imposed, magnetic field, or after deposition by an annealing under a field. The high permeability direction is the easy magnetization axis for the wall permeability at low frequencies, but it is for the direction orthogonal to the easy magnetization axis in the plane of the layer that a high spin permeability is observed at high frequency.

Finally, it should be noted that the properties required for the ferromagnetic material for producing a good quality composite according to the invention are different from those required for producing a good component in electrical engineering. In particular, no constraint is imposed on the coercive field, or on the linearity as a function of the field (because working takes place in a weak field according to the invention).

BRIEF DESCRIPTION OF THE DRAWINGS

FIG. 7 shows the electrical and magnetic field lines in an embodiment of the torus or toroidal core.

FIG. 8 shows a composite with multiple ferromagnetic layers.

FIG. 9 shows the variations of the imaginary component of the permeability of the composite according to the invention for three different materials.

FIG. 10 shows the corresponding variations of the real component.

FIG. 11 shows the variations of the reflection coefficient of a composite according to the invention for these three materials.

FIG. 13 shows a toroidal composite with a magnetization in one or other of two rectangular directions.

DESCRIPTION OF THE PREFERRED EMBODIMENTS

Figure 1:
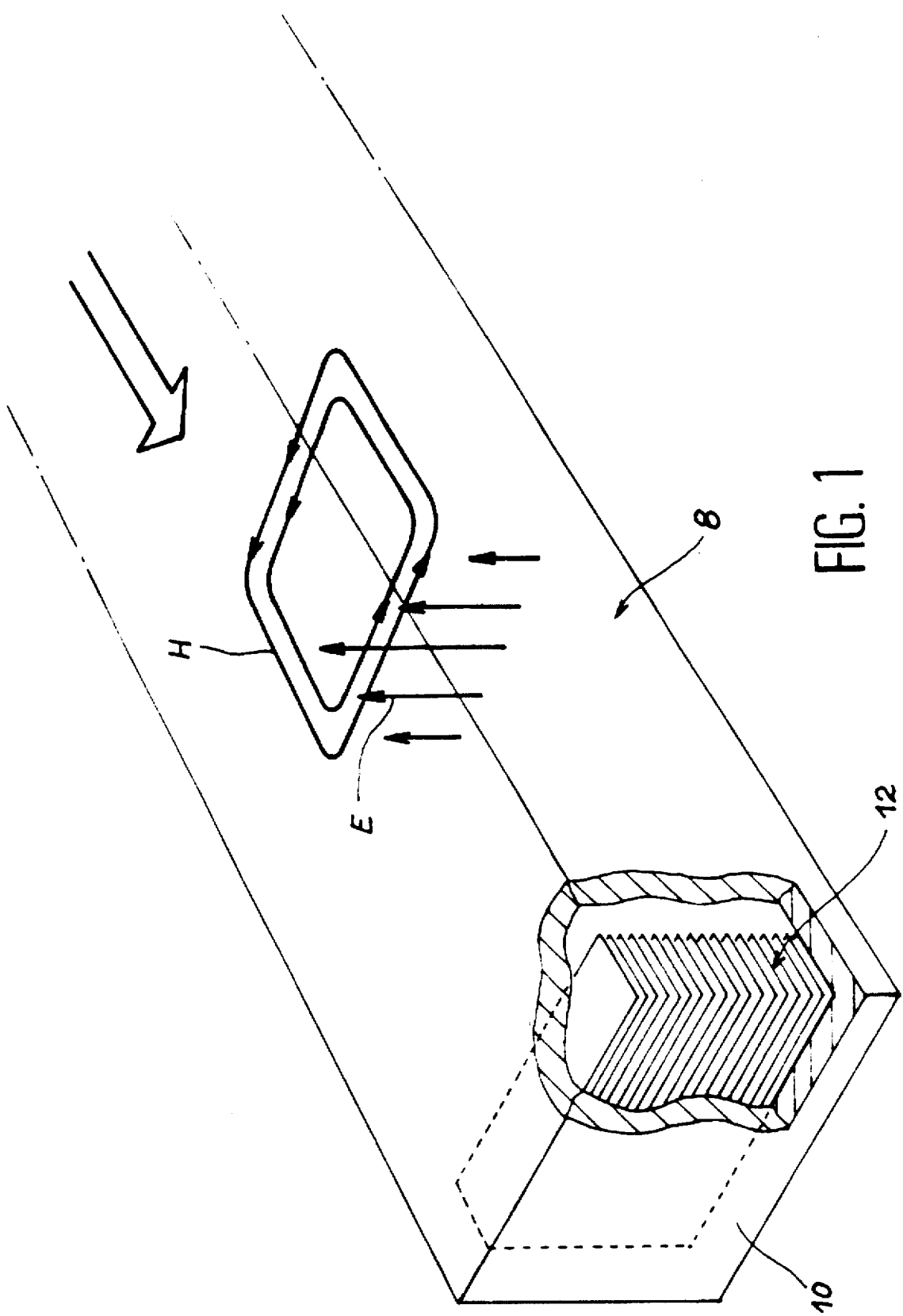
FIG. 1 shows a composite according to the invention located in a rectangular waveguide.

FIG. 1 shows a waveguide 8 with, on the bottom 10, a composite 12 according to the invention in a first embodiment having parallel lamellas. In the illustrated propagation mode, the electrical field E is perpendicular to the plane of the ferromagnetic and insulating layers and the magnetic field H is in the plane of the layers. The composite is then absorbent.

Figure 2:
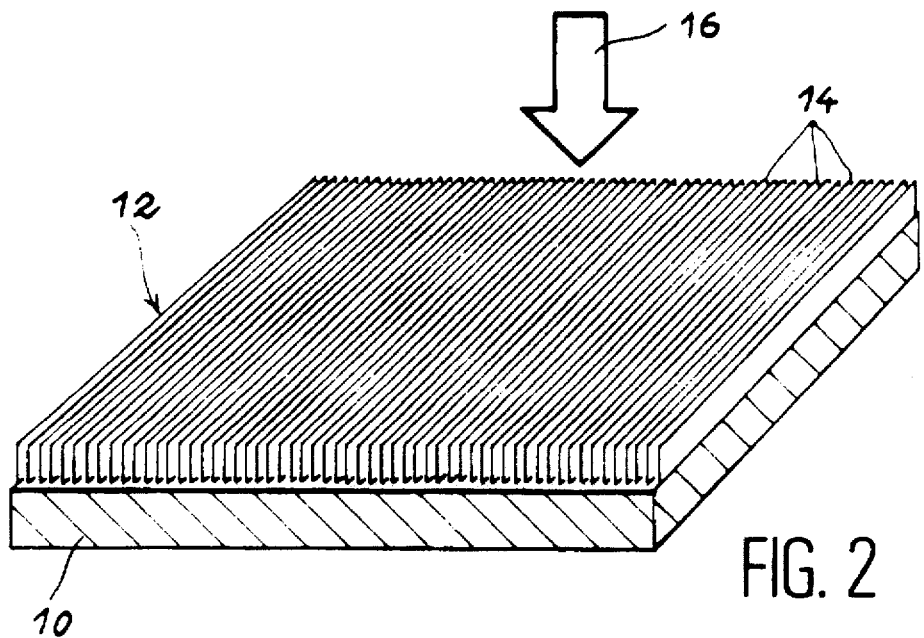
FIG. 2 shows the structure of the composite in a variant with planar lamellas operating either in absorption or in reflection.

FIG. 2 illustrates in simplified, larger-scale manner the structure of the composite according to the invention in this embodiment with lamellas. There is a support 10 (corresponding to the bottom of the waveguide in FIG. 1) and the alternately ferromagnetic and insulating lamellas 14. The incident electromagnetic wave is designated 16. The incidence is not necessarily perpendicular to the free surface of the composite.

Figure 3:
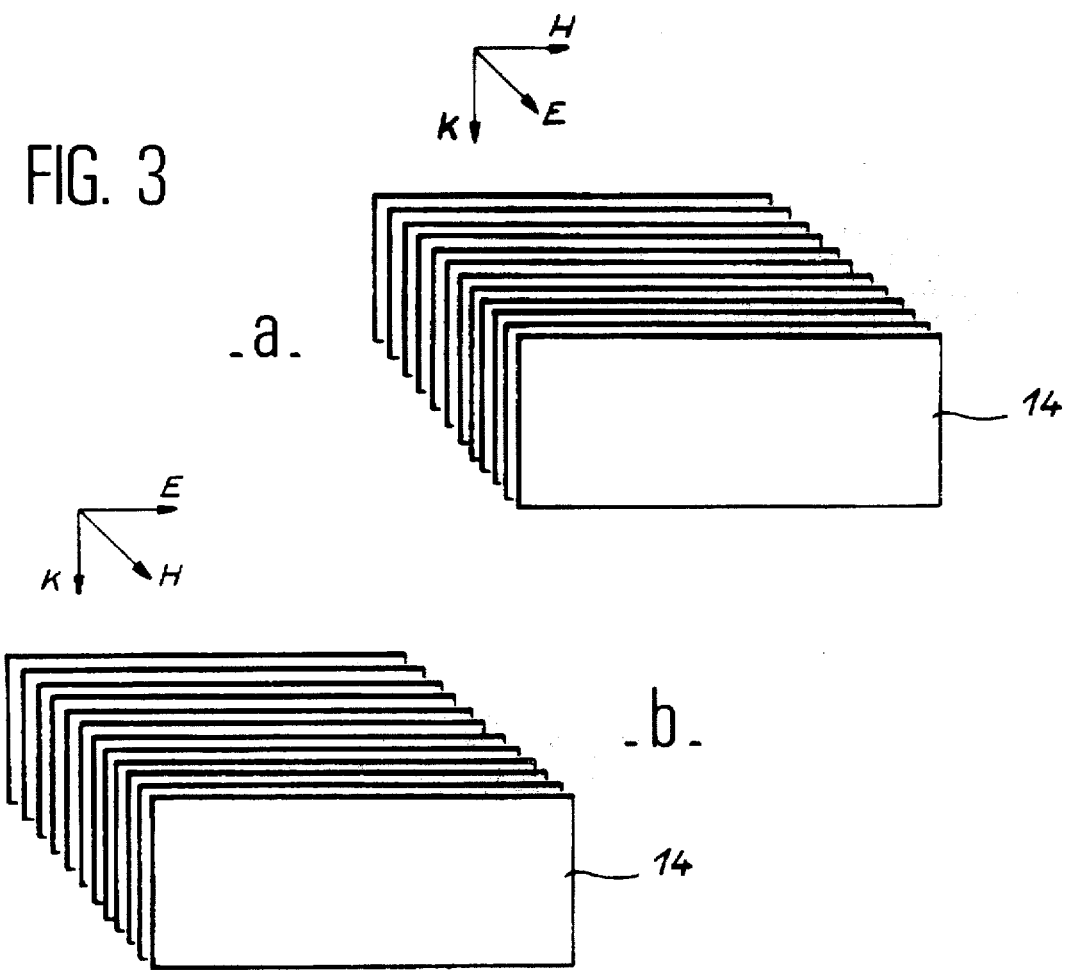
FIG. 3a shows a preferred orientation of the electromagnetic field for operation in absorption.
FIG. 3b shows a preferred orientation of the electromagnetic field for an operation in reflection.

FIG. 3 defines the conditions under which said composite is absorbent or reflecting.

In part (a) of FIG. 3, the magnetic component H of the field is parallel to the ferromagnetic layers. The electrical component E is perpendicular to said same layers. The propagation vector K is then perpendicular to said two components and the composite is then absorbent.

In part (b) of FIG. 3, it is the electrical component E which is parallel to the ferromagnetic layers and the composite is reflecting.

In more general terms, one of the fields (H or E) is perpendicular to the layers, but the propagation direction K is not necessarily perpendicular to the substrate and can in fact be inclined.

Figure 4:
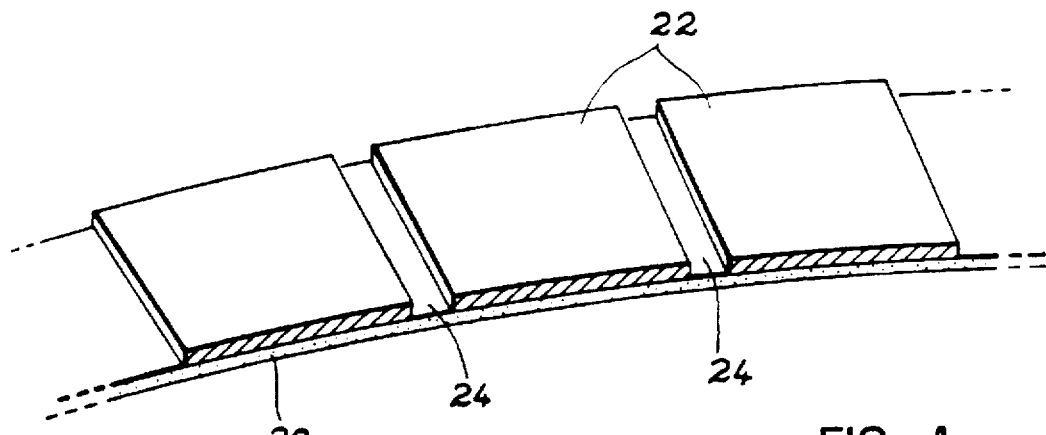
FIG. 4 shows an insulating tape covered by an interrupted ferromagnetic layer from which the composite according to the invention can be produced.

FIG. 4 illustrates a way of producing the composite of FIG. 2. The starting product is an insulating film 20, e.g. of Mylar (registered trademark) and said film is covered with a thin ferromagnetic layer 22, e.g. of CoNiZrMo using any appropriate means (magnetron sputtering, ion gun deposition, chemical or electrochemical deposition). A choice is made of a ferromagnetic material with a substantially zero intrinsic permeability at the frequency Fr at which it is wished to obtain the absorption, with a high μ" at said frequency. The layer thickness will be chosen adequate to ensure that the ferromagnetic volume concentration is sufficient for the permeability μ" at the resonant frequency Fr to be close to or above the permittivity of the composite.

In the embodiment of FIG. 2, where the aim is an absorbent screen under normal incidence, the thickness of the composite will be close to the thickness e such that:

$$e = c/(2\, Pl.Fr.\mu")$$

c being the speed of light and Fr the frequency for which μ'=0.

The film obtained is then cut to obtain a tape. This tape can be cut into lamellas having a given length and all these lamellas can be bonded to one another in order to obtain the lamellar composite of FIG. 2.

To ensure that any short-circuits between two consecutive lamellas do not damage the composite over its entire width, it is appropriate to provide breaks or discontinuities in the ferromagnetic layer. These discontinuities are designated 24 in FIG. 4. They can be directly obtained during the deposition of the ferromagnetic layer (by masking), or after deposition by etching the ferromagnetic material. It is also possible to stretch the flexible film, so as to crack or crackle the deposit.

There is no need for these discontinuities to be regular. It is sufficient that the continuity lengths are relatively small. It must be ensured that the distance between two discontinuities remains well above the thickness of the layer.

As a non-limitative example, the following procedure can be adopted. A deposit is made on unwinding of a ferromagnetic alloy essentially formed from cobalt and 5 to 15% niobium and zirconium (CoNbZr), having a thickness of 0.5 μm on a 12 μm thick Mylar (registered trademark) film. Deposition takes place under a magnetic field, in order to obtain a homogeneous difficult magnetization axis over the entire film. The material has a resonant frequency Fr=1.5 GHz, an imaginary permeability component μ" reaching a maximum of 800 at 1.5 GHz, for the difficult magnetization direction. Strips are cut in this direction and are stacked so as to obtain a plate, where they are illuminated by the edge. When using 2.5 μm of glue or adhesive to produce such an assembly, the volume ferromagnetic level is 3.33%. The composite will have a substantially μ' at 1.5 GHz and a μ" of 800×0.0333=26.7 at said frequency with H parallel to the strips. The permittivity remains the same as that of Mylar, i.e. 3. Thus, the permeability is well above the permittivity, whilst the ferromagnetic charge rate is very low. For a thickness of 1.2 mm, the composite plate placed on a metal plate absorbs an electromagnetic radiation at 1.5 GHz under normal incidence and for polarization parallel to the layers. The total area is 2 kg/m², which is 5 to 10 times lower than the total area of commercially available, resonant, isotropic absorbers, whilst at the same time being thinner. In this total area, the ferromagnetic represents 0.32 kg/m² and the matrix represents the rest. By reducing the insulator quantity (thinner Mylar film, e.g. 3.5 μm), it is possible to reduce the total area and the thickness of the coating, the ferromagnetic quantity per surface unit remaining the same.

Figure 5:
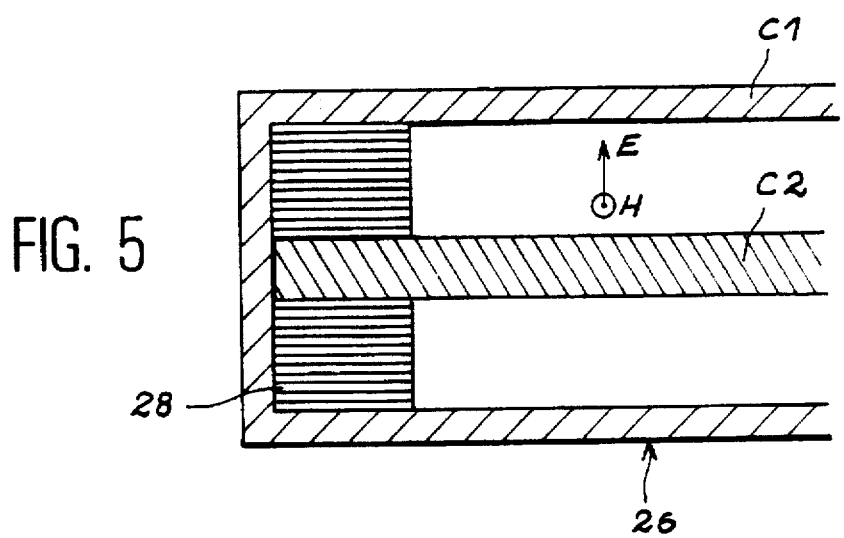
FIG. 5 diagrammatically shows a coaxial line into which has been introduced the toroidal composite.
Figure 6:
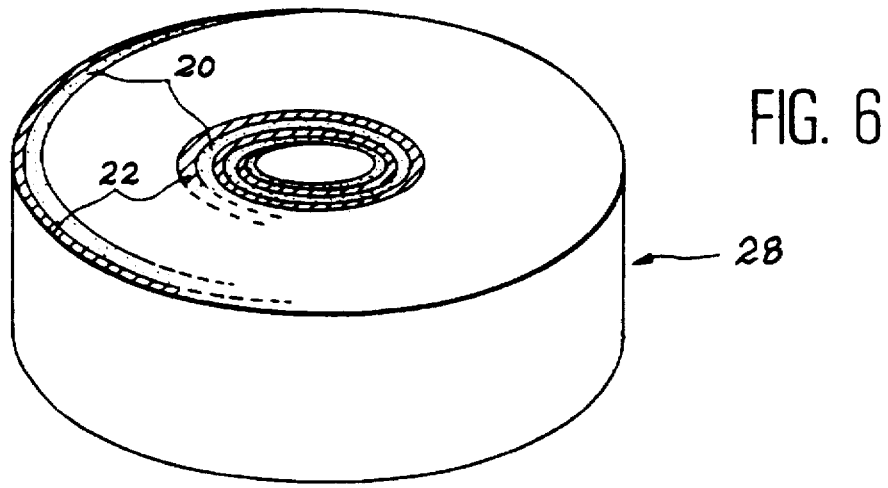
FIG. 6 shows a toroidal composite.

The composite according to the invention can also be used in a coaxial line, as shown in FIG. 5. It is possible to see a coaxial line 26 with its two conductors C1 and C2 and, at its end, a composite 28. This composite surrounds the central core 32 of the line and is consequently toroidal. In order to produce this torus, it is possible to start with the tape of FIG. 4 and wind it onto itself. This gives the torus shown in FIG. 6 under reference 28, where it is also possible to see the insulator 20 and the ferromagnetic 22.

In an end view, FIG. 7 shows the coaxial line C1, C2 and the torus 28. It also shows electrical field lines E, which are radial (in the normal propagation mode which is the TEM mode) and the magnetic field lines H, which are tangential. These magnetic field lines are consequently in the plane of the ferromagnetic layers and therefore the composite 28 is absorbent.

The composite according to the invention is not necessarily constituted by a single ferromagnetic material. It can advantageously incorporate several of these, as shown in FIG. 8. In part a it is possible to see that each ferromagnetic layer 22 is constituted by two joined layers 22/1 and 22/2. These two materials are successively deposited on the same insulator 20, as for the case shown in FIG. 4. It is also possible to separate ferromagnetic layers of different types by insulators in the manner shown in part b, where F1 and F2 are two different ferromagnetics and I1 and I2 two different insulators.

As a result of the use of several materials and several thicknesses, it is possible to produce a composite having a permeability for the preferred polarization which would be difficult or impossible to obtain on the basis of a single material. By using several materials with slightly different resonant frequencies, it is consequently possible to obtain a composite having a much more greatly reduced permeability curve. The more the curve is reduced, the wider the strip of absorbent produced, but also the greater the total area. It is also possible to widen by a factor of 2 the pass band by using greater ferromagnetic thicknesses, which would approach or exceed by a factor of 2 the skin thickness at resonant frequency. Beyond this factor of 2, for the electromagnetic properties there is no interest in increasing the ferromagnetic thickness.

It is also possible to use several ferromagnetics on the same insulator and which resonate at different frequencies, with volume fractions adapted in order to produce a screen resonating at 2 or 3 different frequencies.

Thus, FIG. 9 shows the variations of the imaginary components $\mu''$ of the magnetic permeability for several materials. Curve 34 corresponds to a material M1 comprising an insulator and 6% of a ferromagnetic material F1, whereas the curve 36 corresponds to a material M2 incorporating the same insulator and 9% of a ferromagnetic material F2. Curve 38 corresponds to a composite material with a layer of the same insulator, a ferromagnetic layer F1 of 6% and a ferromagnetic F2 of 9%.

FIG. 10 shows the corresponding variations of the real component $\mu'$.

FIG. 11 shows the variation of the reflection coefficient of a composite for the three materials in question. Curve 44 corresponds to material M1, curve 46 to material M2 and curve 48 to the two superimposed materials M1, M2.

For the material M1 (curve 44), the thickness of the composite is 1 28 mm. for material M2 (curve 46), the thickness is 1.6 mm and for the composite material M1+M2 is 1.1 mm. For all these measurements, the following materials were involved:

ferromagnetic F1: amorphous, 1 µm thick, ferromagnetic alloy $Co_{87}Nb_{11.5}Zr_{1.5}$ (atomic %), deposited on Mylar, ferromagnetic F2: microcrystalline, ferromagnetic alloy $Co_{83}Fe_{6.7}Si_{1.3}B_9$ (atomic %), layer thickness 1 µm, deposited on a polyethylene substrate, insulator: the layers are bonded to one another using standard Araldite (registered trademark) glue.

In order that the ferromagnetic material can undergo an attenuation by the aforementioned gyromagnetic mechanism, it is necessary for the thin ferromagnetic layers to have their easy magnetization axis perpendicular to the direction of the microwave magnetic field, or at least substantially perpendicular to said direction. The lamellar geometry proposed is in general favourable for obtaining said easy magnetization axis in the plane of the film. However, it could occur (dependent on the material) that the direction of the local magnetization of the ferromagnetic films would move away from this easy magnetization axis under the effect of e.g. the macroscopic form of the composite.

Figure 12:
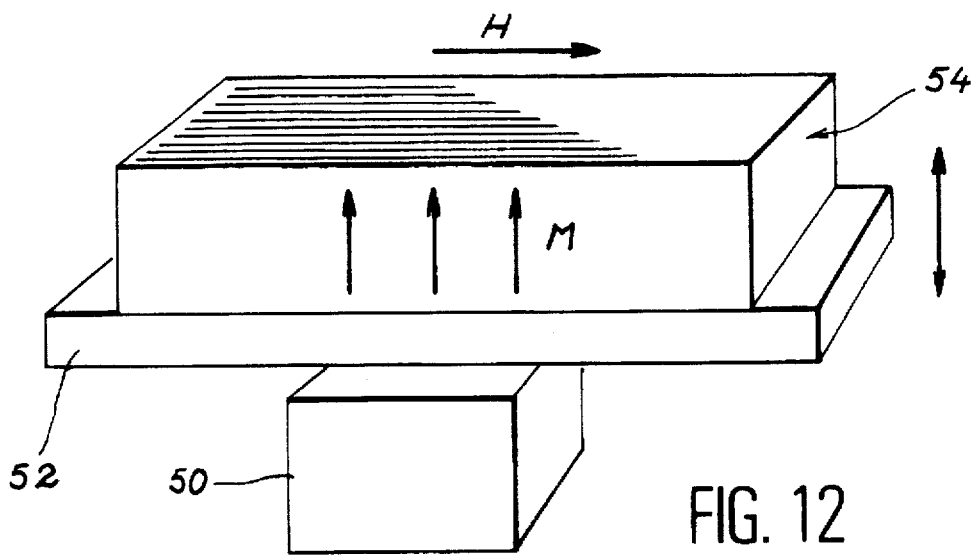
FIG. 12 shows a composite having ferromagnetic layers with an easy magnetization axis directed in accordance with the width of the tape.

In order to maintain the local magnetization in the plane of the ferromagnetic layer and perpendicular to the field H of the preferred polarization, it is possible to make use of magnets. In this case where the ferromagnetic-insulating layers are perpendicular to a support, the magnets could be placed beneath the support, so that the field lines of the magnets are perpendicular to the support and in the plane of the layers. The field produced by the magnets must be relatively intense so that the magnetization is perpendicular to the surface. This is shown in FIG. 12, where it is possible to see a magnet 50 placed below a support 52 covered with a lamellar composite 54.

It would also be possible to use a stack of ferromagnetic layers, whereof at least one has hard magnetic properties and a persistent magnetization in the plane of the layer, said orientation being perpendicular to the preferred polarization direction. As a result of this property, neighbouring layers can be magnetized in the same direction. This can consequently be the case in the structure of FIG. 8, where one of the ferromagnetic layers 22/1 or 22/2 is a hard layer.

It is also possible to use one or more hard ferromagnetic layers with a coercive field greater than the demagnetizing field, which results from the general shape of the composite, the material being magnetized perpendicular to the direction of the preferred polarization field H.

It is particularly appropriate to use for the production of such easy magnetization axis layers, a magnetron deposition process. The "planar" magnetrons have, in their vicinity, a magnetic field oriented perpendicular to the target and perpendicular to the axis of the magnetron. This is not true over the entire surface of the magnetron and in particular on the edges, but applies over a significant part of the surface.

Deposits can be obtained "on unwinding", which consists of passing a flexible film in front of the magnetron whilst continuously winding it. However, the magnetic field of the magnetron is capable of aligning the easy magnetization axis of the deposit in its direction. This makes it possible to obtain a deposit, whose easy magnetization direction is known and constant. This is an important advantage for producing the anisotropic composite, because said direction plays an important part.

The deposit will be more homogeneous if the film is moved perpendicular to the axis of the magnetron. The easy magnetization axis will then be in the film running direction.

These considerations on the respective orientation of the magnetization and the incident magnetic field lead to an operation of the composite in switching, as illustrated in FIG. 13. FIG. 13 shows a toroidal composite 60 magnetically coupled to a winding 62 through which can pass a direct current. The magnetic component of the incident electromagnetic field is tangential and its electrical component is radial. In the absence of an exciting current in the winding 62, the magnetization M in the ferromagnetic layers is tangential. Therefore the field H is parallel to M. No gyromagnetic phenomenon (no precession of spins) can be produced by such a field and the composite is transparent (part a) of FIG. 13). When a current flows in the winding 13, the induction created switches the magnetization M, which then assumes a direction parallel to the overall axis. The field H is then perpendicular to M. The spin precession mechanism can be established and the composite becomes absorbent.

The same switching operation can be obtained with a lamellar composite. If the natural magnetization is parallel to the free surface of the composite, i.e. to the incident magnetic field, the composite is transparent. An external magnetic field can impose a magnetization perpendicular to the free surface and the composite becomes absorbent.

It can be seen on the basis of these examples that there is a difference between the composite according to the invention, which is based on a gyromagnetic phenomenon linked with the precession of spins and which occurs when the incident magnetic field is not parallel to the magnetization, and the conventional electrotechnical coils where the magnetization is necessarily parallel to the magnetic field, because the permeability is rotational (rotation of magnetization). It follows that in the invention µ' is low and µ" high, whereas in electrical engineering coils µ' is high and µ" low. Finally, the range of frequencies is in no way the same, the invention relating to microwaves (approximately 1 MHz to approximately 20 GHz), whereas in electrical engineering coils the frequencies are almost always 50 Hz, or a few hundred Hz.

According to another aspect of the invention, the composite is more particularly suitable for the absorption of high microwave powers. In this case, it is necessary for the absorber to dissipate the heat produced by absorption sufficiently well to ensure that no deterioration occurs. The composite according to the invention is also characterized by its heat dissipating capacity. Thus, the ferromagnetic material is a good heat conductor and the composite will transport the heat parallel to the conductor planes.

When the composite is placed on a metal plate (as described hereinbefore), both in free space and in a waveguide (on the bottom of the guide and/or on the walls), the waves arriving on the free surface produce heat, which is rapidly conducted to the metal support plate. Conventional methods make it possible to dissipate the heat from the support plate (finned radiator, fluid, cooling agent, etc.).

Figure 14:
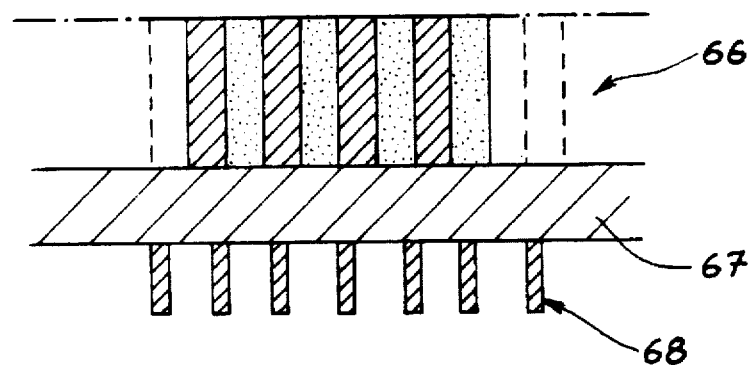
FIG. 14 illustrates an embodiment of an absorbent screen having cooling fins.

Thus, FIG. 14 shows a composite 66 carried by a metal support 67, provided in its lower part with cooling fins 68.

In order to increase the thermal conductivity of the composite along its thickness, a variant of the invention consists of using thicker ferromagnetic films than needed by the microwave properties (e.g. exceeding 3 times the skin thickness).

Figure 15:
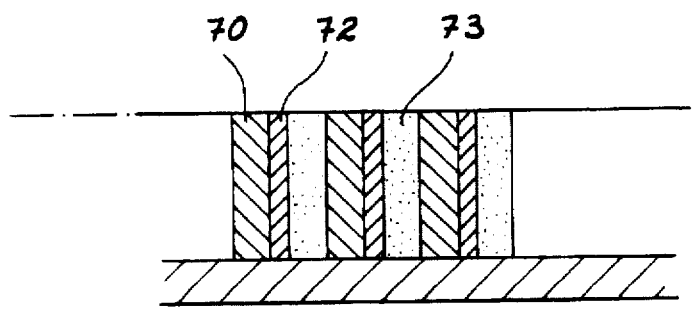
FIG. 15 illustrates a variant with metal layers.

Another variant consists of using ferromagnetic deposits on a good heat conductor (e g. copper), which is itself optionally deposited on a flexible insulating film. This is shown in FIG. 15, where it is possible to see a composite formed from a stack of respectively ferromagnetic 70, metallic 72 (e.g. copper) and insulating 73 layers.

The invention does not exclude the use of one or more isotropic layers deposited on the anisotropic material surface, in order to modify the surface impedance of the composite for the non-preferred polarization (or the surface impedance for the preferred polarization). However, it is clear that it is not possible to obtain an isotropic coating by stacking two anisotropic layers as described hereinbefore and having preferred directions at right angles, because the upper layer would totally reflect the unfavourable polarization before the latter could interact with the lower layer.

We claim:

1. An anisotropic microwave composite comprising
   a support, and
   a stack of thin, continuous, ferromagnetic layers and thin, continuous, electrically insulating layers deposited on said support, said layers being substantially perpendicular to said support, said ferromagnetic layers having a magnetic permeability with a low real part and with a high imaginary part in a frequency range between about 100 Mhz and several dozen Ghz.

2. The composite according to claim 1, wherein said ferromagnetic layers have a thickness comprised between a fraction of the skin thickness in said frequency range and approximately 10 times said skin thickness.

3. The composite according to claim 1, wherein said ferromagnetic layers volume fraction compared with the total ferromagnetic-insulating composite is between 0.3 and 0.7.

4. The composite according to claim 1, wherein the composite has a thickness in the plane of the layers between 0.1e and 10e, e being given by the formula:

$$e = C/2\pi F_r \mu"_r$$

in which $F_r$ is the resonant frequency of the ferromagnetic material and $\mu"_r$ the value of the imaginary component of the magnetic permeability of the composite at said frequency.

5. The composite according to claim 1, wherein the ferromagnetic layers have a magnetic permeability, whose attenuation factor (equal to the mid-height width of the curve giving variations of the ratio of the imaginary component ($\mu"$) with respect to the real component ($\mu'$)) is between 0.5 and 3.

6. The composite according to claim 1, wherein said ferromagnetic layers are constituted by at least two different ferromagnetic materials (22/1, 22/2), having different resonant frequencies.

7. The composite according to claim 6, wherein said two different ferromagnetic materials (F1,F2) are separated by insulators (I1,I2).

8. The composite according to claim 1, wherein said ferromagnetic layers have an easy magnetization axis directed in the plane of the layers.

9. The composite according to claim 1, wherein each ferromagnetic layer is constituted by at least two ferromagnetic materials, whereof one is a material having an easy magnetization axis directed in the plane of the layers.

10. The composite according to claim 8 or 9, wherein said easy magnetization axis is oriented substantially parallel to the propagation direction of the incident electromagnetic field.

11. The composite according to claim 8, further comprising means for producing a magnetic field able to induce, in each magnetic layer, a magnetization having a given direction.

12. The composite according to claim 1, wherein each ferromagnetic layer is interrupted by breaks.

13. The composite according to claim 1, having further a heat conducting bottom, said composite being engaged on said bottom and in good thermal contact therewith.

14. The composite according to claim 1, further incorporating thin, non-magnetic and heat conducting layers, which are in contact with said ferromagnetic layers.

* * * * *